(12) United States Patent
Saravanan et al.

(10) Patent No.: US 12,701,063 B2
(45) Date of Patent: Aug. 4, 2026

(54) QUANTUM COMPUTING DEVICE FOR DETERMINING A NETWORK PARAMETER

(71) Applicant: Telefonaktiebolaget LM Ericsson (publ), Stockholm (SE)

(72) Inventors: Mohan Saravanan, Chennai (IN); Rana Pratap Sircar, Haryana (IN); Afrad Muhamed Basheer, Kerala (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 734 days.

(21) Appl. No.: 18/018,537

(22) PCT Filed: Jul. 29, 2020

(86) PCT No.: PCT/IN2020/050661
§ 371 (c)(1),
(2) Date: Jan. 27, 2023

(87) PCT Pub. No.: WO2022/024135
PCT Pub. Date: Feb. 3, 2022

(65) Prior Publication Data
US 2023/0327969 A1 Oct. 12, 2023

(51) Int. Cl.
G06N 10/20 (2022.01)
H04L 43/08 (2022.01)

(52) U.S. Cl.
CPC ............. H04L 43/08 (2013.01); G06N 10/20 (2022.01)

(58) Field of Classification Search
None
See application file for complete search history.

(56) References Cited

U.S. PATENT DOCUMENTS

| | | | |
|---|---|---|---|
| 7,788,192 B2 | 8/2010 | Amin | |
| 2007/0180586 A1* | 8/2007 | Amin | B82Y 10/00 |
| | | | 977/755 |
| 2021/0042652 A1* | 2/2021 | Das | H03M 13/1575 |

OTHER PUBLICATIONS

PCT International Search Report, mailed Nov. 6, 2020, in connection with International Application No. PCT/IN2020/050661, all pages.
PCT Written Opinion, mailed Nov. 6, 2020, in connection with International Application No. PCT/IN2020/050661, all pages.

(Continued)

*Primary Examiner* — David R Vincent
(74) *Attorney, Agent, or Firm* — Murphy, Bilak & Homiller, PLLC

(57) ABSTRACT

Embodiments described herein relate to a quantum computing device, methods and apparatus for determining a network parameter of a network of nodes The method comprises manipulating quantum states of qubits of the quantum computing device, the qubits arranged into a first and a second register each in equal superposition, the qubits of the first register conditionally influencing the qubits of the second register using operators representing the network. The method performs a first measurement on the qubits of the first register to estimate a principal eigenvalue, then performs a subsequent second measurement on the qubits in the second register, and uses the results of the second measurement corresponding to the principal eigenvalue to calculate the network parameter.

19 Claims, 4 Drawing Sheets

(56)     References Cited

OTHER PUBLICATIONS

Daskin, A., "Quantum Eigenvalue Estimation for Irreducible Non-negative Matrices", arXiv:1505.02984v5 [quant-ph] Nov. 19, 2015, pp. 1-10.

Berry, D.W. et al., "Exponential improvement in precision for simulating sparse Hamiltonians" arXiv:1312.1414v2 [quant-ph], Oct. 7, 2014, pp. 1-28.

Perra, N. et al., "Spectral centrality measures in complex networks", arXiv:0805.3322v2 [physicis.soc-ph], Sep. 23, 2008, pp. 1-11.

Banerjee, P.S. et al., "Determination of Connectivity Using Minimum Connected Dominating Set Based on the Measure of Eigen Centrality in a Heterogeneous IoT Network", J.K. Mandal and D. Sinha (Eds.): CSI 2017, CCIS 836, pp. 197-211, 2018.

Zachary, W.W, "An Information Flow Model for Conflict and Fission in Small Groups", Journal of Anthropological Research—Nov. 1976, vol. 33, 1977, 23 pages.

European Communication and Search Report issued Aug. 14, 2023 in connection with counterpart European Patent Application No. 20 947 472.5, 10 pages.

* cited by examiner

300

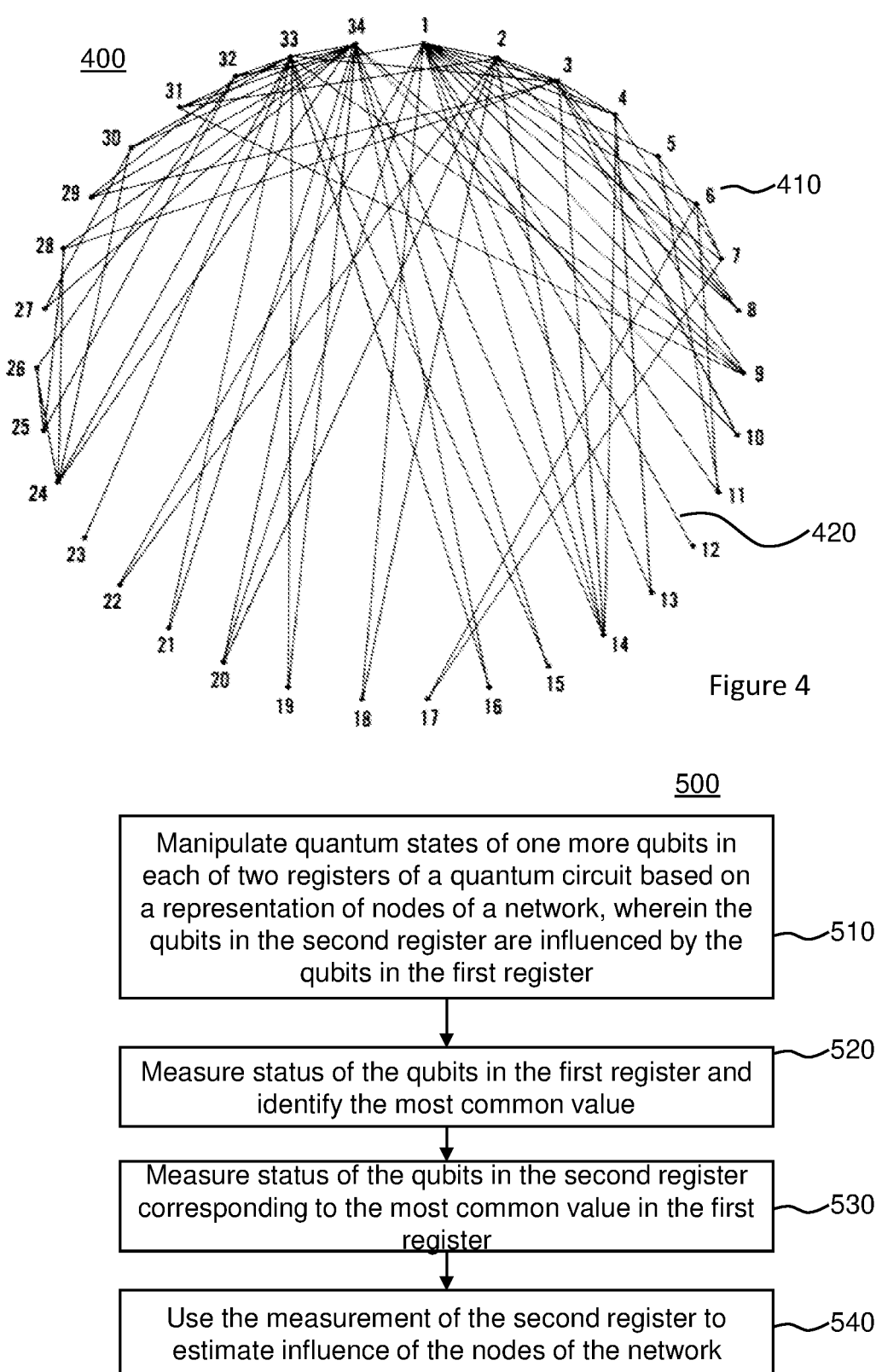

| Manipulate quantum states of one more qubits in each of two registers of a quantum circuit based on a representation of nodes of a network, wherein the qubits in the second register are influenced by the qubits in the first register | 510 |

| Measure status of the qubits in the first register and identify the most common value | 520 |

| Measure status of the qubits in the second register corresponding to the most common value in the first register | 530 |

| Use the measurement of the second register to estimate influence of the nodes of the network | 540 |

Figure 5

QUANTUM COMPUTING DEVICE FOR DETERMINING A NETWORK PARAMETER

TECHNICAL FIELD

Examples of the present disclosure relate to a quantum computing device which may be used for determining a parameter of a network such as, by way of example only, influential nodes in a telecommunications network. The quantum computing device may be arranged to determine an eigenvector associated with a representation of the network. Network resource allocation may be based on the determination of influential nodes using the eigenvector.

BACKGROUND

Fifth generation (5G) telecommunications networks as specified by the Third Generation Partnership Project (3GPP) are evolving to empower new services and use cases for users including people and machines or autonomous or semi-autonomous devices enabling the Internet of Things (IoT). 5G provides unprecedented speed and flexibility, and carries more data with greater responsiveness and reliability than ever before. 5G uses cases include massive Machine type communications (mMTC) as well as enhanced mobile broadband (eMBB).

One of the major issues of mMTC is service and influence discovery. That is, discovering which nodes are able to execute specific services and provide the required data for 5G applications to be correctly provisioned and deployed. As the number of nodes in the network and the complexity of connections between nodes increases, this issue becomes more difficult to resolve.

In recent years, with increasing value of social networks data, the integration of social media and the IoT can be seen in areas such as product-design, traffic routing, etc. and is studied under a Social IoT (SIoT) paradigm, where objects such as IoT devices establish social-like relationships. SIoT adapts a service-oriented architecture where heterogeneous IoT devices can offer or request autonomous services and collaborate on behalf of their owners. This has become important for driving 5G uptake due to usage in monitoring human daily lives and leveraging the enabling technologies including smart objects, smart sensing, cloud and edge computing etc. Rapidly increasing numbers of 5G SIoT nodes and data is driven by increasing numbers of smart devices with embedded smart sensors. This ranges from smart watches and smartphones to healthcare wearable and head-mounted devices. As an example application, the recent increase in availability and use of smart wearable devices and the ubiquity of smartphones allows caregivers to monitor health conditions on a continuous basis.

One known measure to determine highly influential nodes in a network is to use eigen centrality, as described for example in the following references:

Partha Sarathi Banerjee, Satyendra Nath Mandal, and Biswajit Maiti. Determination of connectivity using minimum connected dominating set based on the measure of eigen centrality in a heterogeneous iot network. In Jyotsna Kumar Mandal and Devadatta Sinha, editors, Social Transformation—Digital Way, pages 197-211, Singapore, 2018. Springer Singapore Nicola Perra and Santo Fortunato. Spectral centrality measures in complex networks. Phys. Rev. E, 78:036107, September 2008

Lin-Feng Zhong, Ming-Sheng Shang, Xiao-Long Chen, and Shi-Ming Cai. Identifying the influential nodes via eigen-centrality from the differences and similarities of structure. Physica A: Statistical Mechanics and its Applications, 510:77-82, 2018

However, this is a challenging task in a network which may contain billions of nodes and which provides heterogeneous features or services. The process is computationally expensive and may be difficult to scale to large networks using known techniques.

SUMMARY

It is an object of the present disclosure to provide improved methods and apparatus for determining a network parameter of a network of nodes.

In one aspect there is provide a method of using a quantum computing device to determine a network parameter of a network of nodes. The method comprises manipulating quantum states of qubits of the quantum computing device, the qubits arranged into a first and a second register each in equal superposition, the qubits of the first register conditionally influencing the qubits of the second register using operators representing the network. A first measurement is performed on the qubits of the first register to estimate a principal eigenvalue. A subsequent second measurement is performed on the qubits in the second register. The results of the second measurement corresponding to the principal eigenvalue are used to calculate the network parameter.

This allows the network parameter to be determined directly from measurements of the second register, allowing a much more scalable method of analysing large networks. For example, influential nodes may be identified in a telecommunications network and automatically allocated additional resources to add resilience and reduce undesirable loading effects such as latency or connection loss.

In an embodiment the second register is initialised to $|+\rangle^{\otimes n}$ before manipulating the qubits. The operators may be unitary matrices each associated with a qubit of the first register and applied to the qubits of the second register depending on the state of the respective qubit of the first register. The unitary matrices may be derived from a Hamiltonian of an unweighted undirected graph of the network.

The manipulating quantum states of the quantum computing device may be performed a plurality of times and each time the first and second measurements result in respective first and second values, and the principal eigenvalue corresponds to the most common first value from the first measurements. The influence measure of each node may be determined from the relative frequency of occurrences of corresponding second values from the second measurements. The network parameter may be an influence measure of each node and may be determined from the relative frequency of occurrences of corresponding second values from the second measurements. The influence measure may be an eigen centrality measure of a node and may be determined from the square root of the relative frequency or percentage of occurrences of the corresponding second value.

Embodiments may provide a number of advantages including: faster execution faster and improved scaling for the optimization problem of finding the network parameter; quantum computing algorithms with smaller qubits and gates which are faster in execution compared to classical computing algorithms; the provision of an efficient algorithm for vertex centrality ranking in mMTC network analysis to find the most influential nodes in a complicated and heterogenous SIoT network; enabling quantum algorithm developers to best utilize IoT platform resources and to envisage an efficient model to identify influential members for futuristic SIoT applications.

In another aspect there is provided a quantum computing device comprising first and second registers of qubits each register arranged in an equal superposition, and a quantum circuit having a unitary operator associated with each qubit of the first register to conditionally influence the qubits of the second register. The quantum computing device also comprises a first measurement gate to measure a state of each qubit in the first register and a second measurement gate to measure a state of each qubit in the second register following measurement of the first register.

In an embodiment the quantum circuit may comprise Hadamard gates arranged to act on each qubit of the first and second registers. The quantum circuit may also comprise a Quantum Fourier Transform circuit arranged to act on the qubits of the first register before the first measurement circuit. The second measurement circuit may be arranged to measure the qubits of the second register directly following application of the unitary operators.

A classical processor may be used to estimate an eigenvector of the unitary operator using the measurement of the first and second registers.

In another aspect there is provided an apparatus for determining a network parameter of a network of nodes, the apparatus comprising a processor and memory containing instructions executable by the processor whereby the apparatus is operable to manipulate quantum states of qubits of a quantum computing device, the qubits arranged into a first and a second register each in equal superposition, the qubits of the first register conditionally influencing the qubits of the second register using operators representing the network. The apparatus is also operable to perform a first measurement on the qubits of the first register to estimate a principle eigenvalue, perform a subsequent second measurement on the qubits in the second register, and use the results of the second measurement corresponding to the principle eigenvalue to calculate the network parameter.

According to certain embodiments described herein there is also provided a computer program comprising instructions which, when executed on a processor, cause the processor to carry out methods described herein. The computer program may be stored on a non-transitory computer readable media.

BRIEF DESCRIPTION OF THE DRAWINGS

For a better understanding of examples of the present disclosure, and to show more clearly how the examples may be carried into effect, reference will now be made, by way of example only, to the following drawings in which:

FIG. 4 shows a network having nodes with high influence;

FIG. 5 is a flow chart of another example of a method of estimating the influence of network nodes.

DETAILED DESCRIPTION

Figure 1:
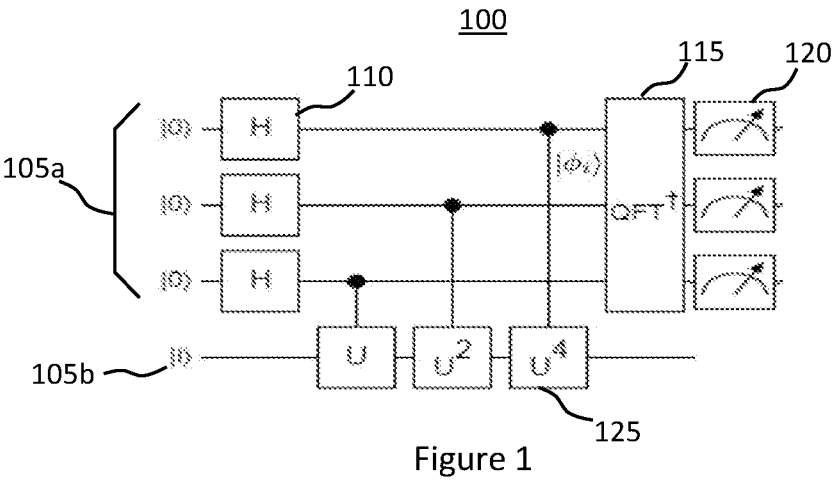
FIG. 1 shows an example of a quantum circuit to compute an eigenvalue.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Embodiments relate to network analysis for example determining a parameter of a network such as eigen centrality which can be used to determine influential nodes in the network. Determining influential nodes of a network can be used for a number of purposes including allocating additional network resources to influential nodes to ensure sufficient capacity and resiliency at these critical parts of the network. However, current methods of determining eigen centrality do not scale well as the number of nodes increases and therefore may not be capable of effectively analyzing emerging 5G networks.

Quantum computers (QCs) promise a new form of computing that is qualitatively different from previous "classical" forms of computation. While QCs are technically more difficult to build, and the best current general-purpose quantum computers have only 50-100 qubits, they can solve some problems with a time that grows more slowly as a function of the input size, and therefore are suitable for analyzing large networks where the computational expense and/or time required by classical computing may be prohibitive.

In this specification, the term quantum computing devices may include quantum circuits which are models for quantum computing which are executed on classical computing devices to simulate quantum algorithms implied by the quantum circuit.

The term "qubit" refers to a quantum two-level system, such as the spin of a spin-½ particle. Qubits can be thought of as a generalization of classical bits (cbits) in that cbits can be in states 0 or 1, while the state of a single qubit is described by complex numbers $\alpha_x$ and $\beta_x$ satisfying $|\alpha_x^2|+|\beta_x^2|=1$. A qubit is a state in a complex vector space of dimension 2. In the standard basis, it can be represented as $|\varphi>=\alpha_x|0>+\beta_x|1>$, with $|\alpha_x^2|+|\beta_x^2|=1$. If $\alpha_x=0$ or $\beta_x=0$, then the bit is equivalent to a classical bit. Otherwise, the qubit is said to be in a superposition of $|0>$ and $|1>$.

A register is a composite system of qubits in which a system with n qubits is defined in a complex vector space of dimension $2^n$. This is given by the tensor product of n complex vector spaces of dimension 2.

A finite-dimensional Hilbert space H is a finite dimensional vector space with an inner product defined. A state, in quantum computing and quantum information, is defined as a positive semi-definite matrix $\rho$ with tr($\rho$)=1. A pure state is a rank 1 state, in which case, one can express it as it's eigenvector $|\varphi\rangle \in$ H, such that $\langle\varphi|\varphi\rangle$=1. A mixed state is a state with rank >1, in which case one can express it using spectral decomposition as a convex sum of pure states. The matrix notation of a state is called the density matrix.

A qubit changes its state by going through one or more unitary transformations. A unitary matrix or gate is a matrix $U \in$ B(H), where B(H) is the set of all matrices over H, such that UU*=U*U=I. An example is the Hadamard gate which is described by unitary matrix H=

$$\frac{1}{\sqrt{2}}\begin{pmatrix} 1 & 1 \\ 1 & -1 \end{pmatrix}.$$

Measurement corresponds to transforming the quantum information stored in a quantum system into classical information, so that for example one of the $2^n$ values in a register of n qubits is output—for example a register having 20 qubits has 4,294,967,296 available values and measurement will output one of these. A measurement is defined by a set of measurement operators, M={$M_i$} such that $$\Sigma_i M_i^* M_i = I$$

During measurement, the probability of seeing the outcome i is $$P(i) = \langle\varphi|M_i^* M_i|\varphi\rangle$$

and the post measurement state is given by $$\frac{M_i|\phi\rangle}{\sqrt{\langle\phi|M_i^* M_i|\phi\rangle}}.$$

For a density matrix $\rho$, the probability of seeing the outcome i is $$P(i) = tr(M_i^* M_i \rho)$$

and the post measurement state is given by $$\frac{M_i \rho M_i^*}{tr(M_i^* M_i \rho)}.$$

The power of quantum computers comes from scaling. A system of n classical bits (cbits) can be in $2^n$ different states while the state of n qubits is described by a complex unit vector of length $2^n$. These vectors (also called wavevectors or wavefunctions) can be transformed by multiplying them by unitary matrices. For example, the wavevector can be Fourier transformed using $O(n^2)$ elementary quantum gates. However, not all transformations can be done efficiently. The laws of quantum measurement also limit the amount of information that can be extracted from a quantum state. A full measurement of the state yields outcome x with probability $|\alpha_x|^2$ destroying the state in the process. Thus, even though describing the quantum state of n qubits requires an amount of information that scales exponentially with n, measurement can only extract n bits of information. Finding a way to benefit from the exponential state space of quantum computers despite this and other limitations is the central challenge of writing new quantum algorithms.

A known quantum phase estimation algorithm or circuit is shown in FIG. 1. Quantum phase estimation algorithms have been successfully adapted as a sub-frame of many other algorithms applied to a wide variety of applications in different fields. The quantum phase estimation algorithm 100 comprises two registers 105a and 105b each comprising a group of qubits. The qubits of the first register 105a are initially set to zero and the qubits of the second register 105b are set to an eigenvector. Hadamard gates 110 act on respective qubits of the first register 105a which maps the basis state $|0\rangle$ to $(|0\rangle+|1\rangle)/\sqrt{2}$ and $|1\rangle$ to $(|0\rangle-|1\rangle)/\sqrt{2}$. This means that a measurement will have equal probabilities to become 1 or 0, in other words the qubits are in superposition.

Unitary evolution operators 125 $U^{2^j}$ controlled by the j-th qubit of the first register 105a are applied to the second register 105b. The corresponding unitary operator U is only applied if the corresponding control bit from the first register 105a is $|1\rangle$. The algorithm uses phase kickback to write the phase of U (in the Fourier basis) to the qubits in the second register 105b. Kickback is where the eigenvalue added by a gate to a qubit is 'kicked back' into a different qubit via a controlled operation.

After application of the unitary operators 125 an inverse Quantum Fourier Transform (QFT) circuit 115 applies an inverse quantum Fourier transform such that the quantum state of the circuit holds the superposition of the eigenvalues. The QFT circuit 115 translates from the Fourier basis into the computational basis, which can be measured. Measurement of the first register 105a using measurement circuits 120 yields an estimate of the eigenvalue of the input eigenvector to high probability.

However, the requirement of an eigenvector given as an input to the algorithm hinders the application of the algorithm to problems that do not have any prior knowledge about the eigenvector; such as eigen centrality of a network.

Anmer Daskin, "Quantum eigenvalue estimation for irreducible non-negative matrices", International Journal of Quantum Information, 14(01):1650005, 2016, describes a modified eigenvalue estimation algorithm of an irreducible non-negative matrix without having an initial estimate of the eigenvector. This uses a similar algorithm to that of FIG. 1 but in which Hadamard gates are also applied to the second register qubits and to the output of the unitary operators U, whereupon the second register is measured to collapse the system to the state where the phase associated with a positive eigenvector and the first register can then be measured to determine the eigenvalue.

Figure 2:
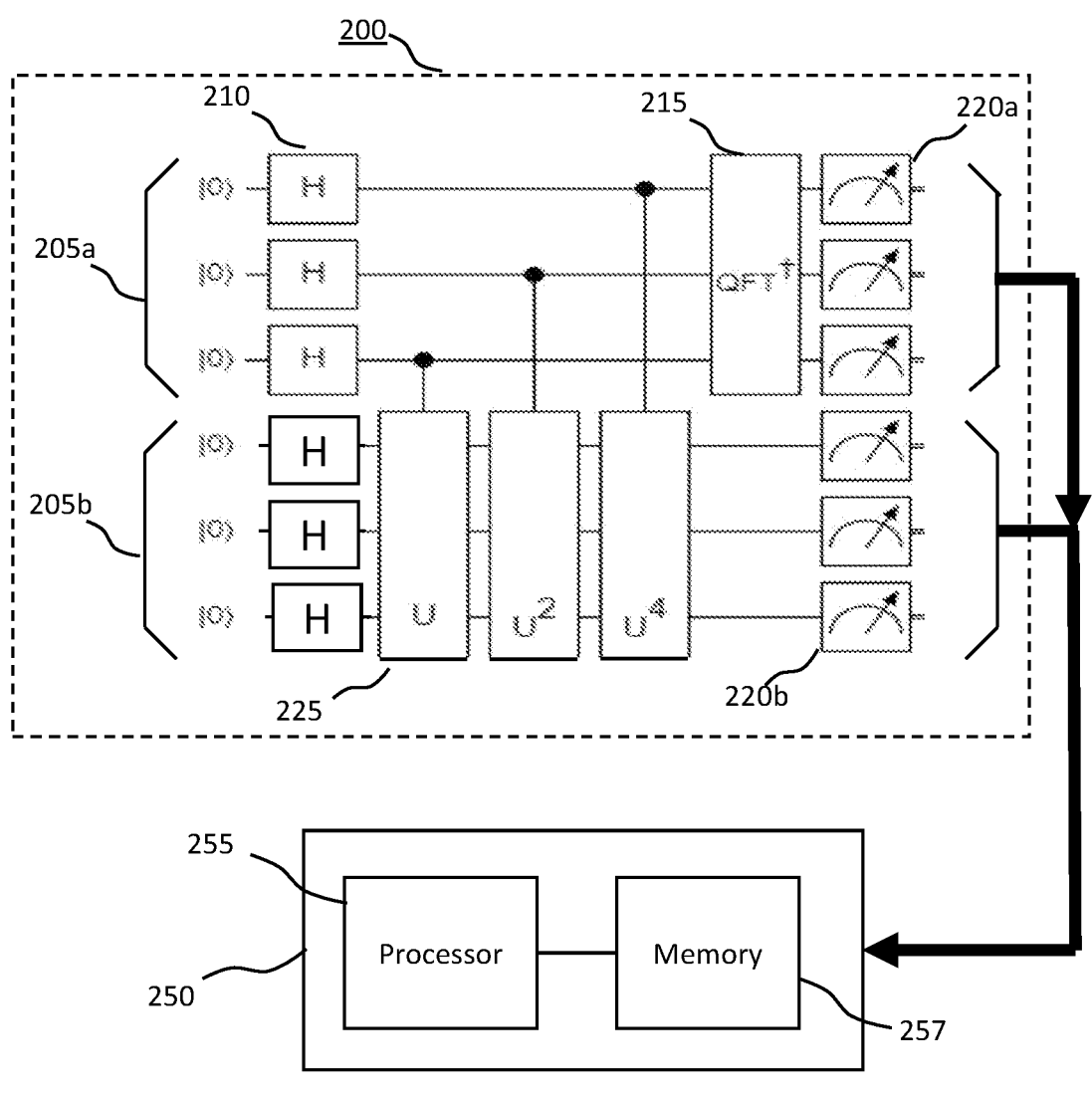
FIG. 2 shows an example of a quantum circuit to compute an eigenvector.

FIG. 2 illustrates a hybrid quantum and classical computing system according to an embodiment. A quantum computing device 200 has an output coupled to a classical computing device 250 which may also control operation of the quantum computing device 200. The quantum computing device 200 may be implemented as a quantum circuit simulating a quantum algorithm on a classical computing device or it may be a quantum computing using manipulation of subatomic particles to implement and operate on qubits.

The quantum computing device 200 comprises a first register 205a having a number m of qubits and a second register 205b having a number n of qubits, where m and n need not be equal. Each qubit of the first and second registers 205a-b is associated with a Hadamard gate 210 to put the qubits of the registers in equal superposition.

Unitary operators or gates 225 are used to apply a respective unitary operator $U^{2^j}$ controlled by the j-th qubit of the first register 205a to the second register 205b. The corresponding unitary operator U is only applied if the corresponding control bit from the first register is |1>. The algorithm uses phase kickback to write the phase of U (in the Fourier basis) to the qubits in the second register. Kickback is where the eigenvalue added by a gate to a qubit is 'kicked back' into a different qubit via a controlled operation. An inverse Quantum Fourier Transform (QFT) circuit 215 is used to translate this from the Fourier basis into the computational basis where this can be measured. The unitary operators or gates 225 can be implemented as a quantum circuit.

The quantum computing device 200 also comprises first measurement gates 220a to measure a state of each qubit of the first register 205a, and a second measurement gates 220b to measure a state of each qubit of the second register 205b. The second measurement gate 220b is arranged to measure the qubits of the second register only after the first measurement gate 220a has measured the qubits of the first register 205a. In this embodiment, the measurement of the second register may directly follow operation of the unitary operators 225, in other words there are no intermediate operations such as Hadamard gates. Measurement of the first register 205a collapses the state of the system and the measurements of the second register 205b can then be output to the classical computer 250 for further processing.

The classical computer 250 comprises a processor 255 and memory 257. The quantum computing device 200 may be run a number of times and values output from the first measurement gates 220a are stored by the classical computer 250 in its memory 257. Values output from the second measurement gates 220b are retrieved after each first measurement and stored in memory 257 together with the corresponding first measurement values. Once the quantum computer device 200 has been run and predetermined number of times, the values from the first and second measurement gates 220a-b may be analyzed, for example to determine the influence of a network encoded within the quantum computing device. As described in more detail below, the values of the qubits of the second register 205b correspond to the eigenvector of the unitary operator U of the unitary gates 225, and these can be used to analyze the network nodes.

By encoding characteristics of a network in the unitary operators 225, the output of the quantum computing device 200 may be used to determine the eigen centrality nodes in the network, with the determined eigenvector indicating the most influential nodes.

A network may be modeled by a graph which is a mathematical structure used to model pairwise relations between nodes, for example as illustrated in FIG. 4. The graph 400 comprises vertices or nodes 410 connected by edges or links 420. A network such as a telecommunications network may be modeled as an undirected unweighted graph. The adjacency matrix of the graph or network is determined by indicating, in a square matrix of the vertices, which pairs of vertices are adjacent or connected by edges. Eigenvector centrality is a measure of the influence or connectedness of nodes or vertices in the network. A high eigenvector or "prestige" score means that a node is connected to many nodes who themselves have a high score.

There are many eigenvalues for which a non-zero eigenvector solution of the adjacency matrix exists. By the Perron-Frobenius theorem, a real square matrix with positive entries has a unique largest eigenvalue and a corresponding eigenvector with positive components. The i-th component of the eigenvector gives the relative eigen centrality score of the i-th vertex. Therefore, the eigen centrality measures for network nodes can be read out from the eigenvector associated with the largest eigenvalue of the adjacency matrix for the network.

To find the eigenvector of the network's adjacency matrix, the inventors have appreciated that a modified version of a quantum phase estimation circuit illustrated in FIG. 1 may be used, in which the second register is measured after the first register and the values of the second register qubits have the square root of their relative occurrence calculated to find the eigen-centrality values for the respective network nodes. Such a quantum algorithm may be implemented by the quantum computing device 200 of FIG. 2 for example.

The network's adjacency matrix is used as the Hamiltonian, and a Hamiltonian simulation is used to find the unitary operator or matrix U of a quantum phase approximation circuit. But instead of measuring and using the values of the first register of qubits to find an eigenvalue, the values of the second register are also measured and are read to find the eigenvector to find the influence of the network nodes.

Figure 3:
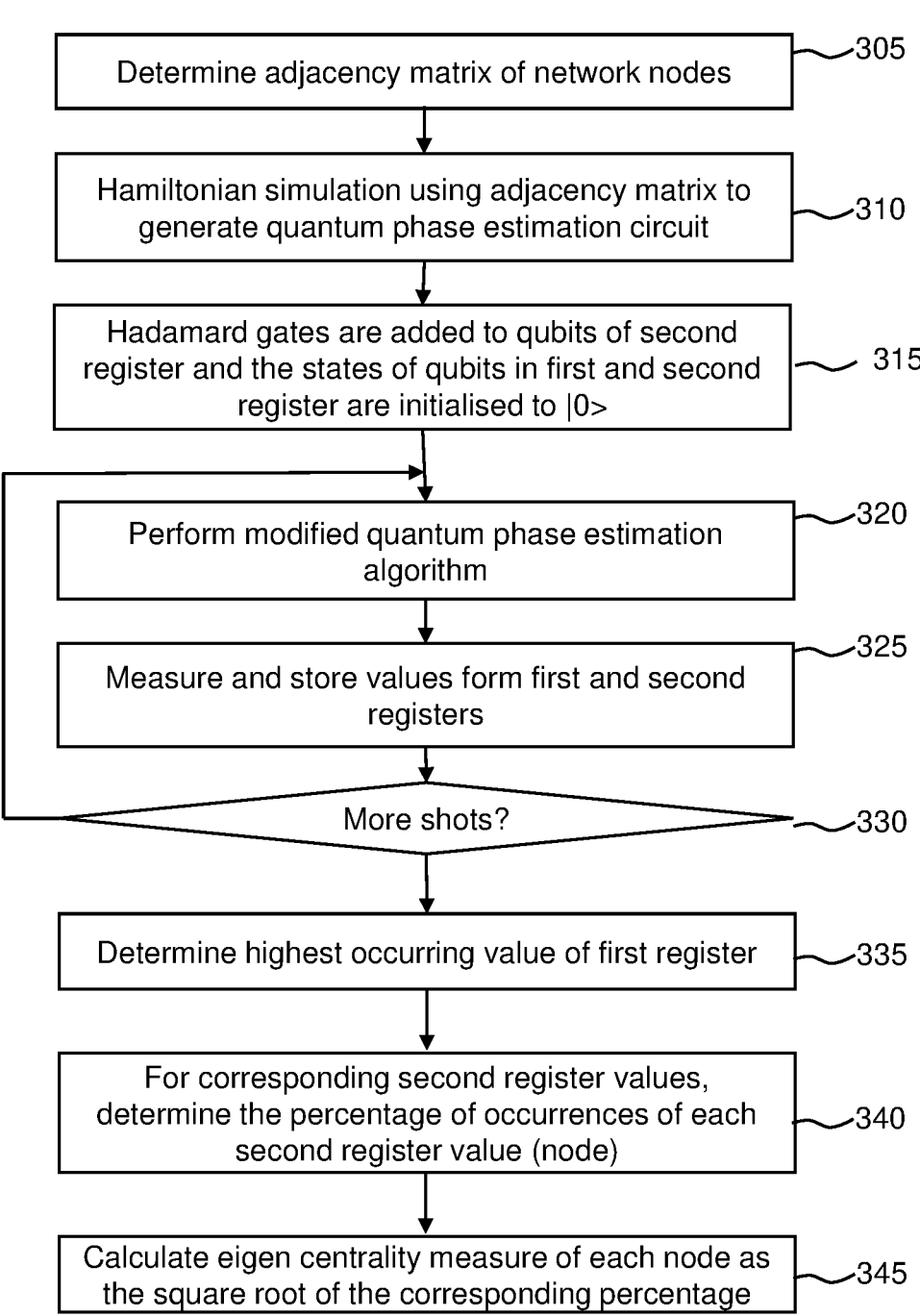
FIG. 3 is a flow chart of an example of a method of estimating the influence of network nodes.

FIG. 3 illustrates a method 300 of estimating the influence of nodes in a network using eigen centrality and according to an embodiment. The method may be performed by a combination of classical and quantum computing devices, for example the system of FIG. 2 and the network of FIG. 4. The method 300 would now be explained in detail with reference to the system of FIG. 2 and the network of FIG. 4.

At step 305, the method 300 determines an adjacency matrix of the network 400. In eigen centrality, we assume that the influence of a node is the average influence of its neighbors. This can be expressed mathematically as $$x_v = (1/\lambda) \Sigma_{x_t \in N(v)} x_t$$

where N(v) is the set of neighbors of vertices v and A is a normalizing constant. Therefore, for all nodes, this can be rearranged and written as $$Ax = \lambda x$$

This can be rearranged and then for all the nodes in a graph with adjacency matrix A, this becomes an eigenvector of A. The eigenvectors of A and exp(iA) would be the same. The adjacency matrix $A = [a_{ij}] = 1$ if node i is connected to node j, else 0. Now, we would like all the influence values to be positive, which they are for an undirected graph. Using the Perron-Frobenius theorem, it can be shown that for an undirected graph, the eigenvector associated with the largest (in modulus) eigenvalue has all entries positive. This vector gives the eigen centrality measure of each node in the community.

At step 310, the adjacency matrix A of the network 400 is used as the Hamiltonian in a Hamiltonian simulation to calculate the unitary operators U^2^j for a quantum phase estimation circuit 200. This process is described in more detail in DOMINIC W. BERRY, ANDREW M. CHILDS, RICHARD CLEVE, ROBIN KOTHARI, and ROLANDO D. SOMMA. Exponential improvement in precision for simulating sparse hamiltonians. *Forum of Mathematics, Sigma,* 5:e8, 2017.

The quantum phase estimation algorithm is a known quantum circuit that can find a good approximation of the eigenvalue of a given eigenvector of a unitary matrix. Note that the eigenvalues of unitary matrices are all in the form $e^{2\pi i\theta}$, where $\theta \in R$. The problem can be formally stated as; given a unitary matrix U and one of it's eigenvectors |u>, compute the phase $\theta$ to a good approximation.

This quantum phase estimation algorithm or circuit has two registers, a first register R1 205a with n qubits and a second register R2 205b with m qubits, where $m = \lceil \log_2 |V| \rceil$, V is the number of nodes and n depends on the precision. In practice, the number of nodes in the graph should be as close to $2^k$, for some integer k, as possible. This is to reduce the effect of the eigen vectors associated with the 0 eigenvalues.

At step 315, Hadamard gates 210 are added to the qubits of the second register 205*b* and the states of the qubits of the first and second registers 205*a-b* are initialized to |0>, or |+>$^{\otimes^{m+n}}$ following the Hadamard gates 210. Unlike in the standard quantum phase estimation circuit, there is no need to initialize the qubits of the second register 205*b* to an eigenvector.

This results in a modified quantum phase estimation circuit which is used to manipulate quantum states of qubits of the quantum computing device. By operation of the modified quantum phase estimation circuit, the qubits are arranged in a first and a second register each in equal superposition and where the qubits of the first register conditionally influence the qubits of the second register using operators representing the network. In this embodiment, the manipulation is described in more detail with respect to step 320 below, although alternative methods of manipulation may be used.

Instead of having an eigenvector in the second register R2, there is an equal superposition state. This state can also be written in terms of the eigenvectors of U=e$^{iA}$ where A is the adjacency matrix, and U is the unitary operator having eigenvectors that span the entire space.

At step 320, the modified quantum phase estimation algorithm is performed with the second register 205*b* initialized as |+>$^{\otimes m}$. That is the controlled unitary operators U$^{2i}$ 225 and the inverse QFT 215 are applied to the first register 205*a* and this results in the state $$\sum\nolimits_{i=1}^{2^m} \alpha_i |\phi_i\rangle |u_i\rangle$$

where $\varphi_i$ is the approximation of the phase of an eigenvalue and U$_i$ is its associated eigenvector. This is because instead of having one eigenvector initialized in the second register 205*b*, we have some linear combination of the eigenvectors. Note that $\alpha_i=\langle+^{\otimes m}|U_i\rangle$. This follows directly when writing |+>$^{\otimes m}$ in the eigen basis of U, which is the same as the eigen basis of A. That means, each $$\alpha_i = \sum\nolimits_{j=1}^{2^m} u_{ij},$$

which means each $\alpha_i$ is the sum of the values of the eigenvector.

At step 325, the qubits of the first register R1 205*a* are measured to determine an eigenvalue of U. The values are stored, in memory 257, for later analysis. The corresponding values of the qubits of the second register R2 205*b* are also measured and stored. To find the values of the eigenvector corresponding to the principal eigenvalue, the qubits of the second register 205*b* are measured following measurement of the qubits of the first register 205*a* at step 330. It can be seen from the form of |$\psi_2$> that if R1 is in |$\varphi_p$>, R2 will be in |u$_p$>.

We want the eigenvalue for the eigenvector with positive entries and the $\alpha_i$ corresponding to that eigenvector will most likely be greater than that of eigenvectors with negative entries. Therefore, if we measure the first register 205*a*, we will get |$\varphi_i$> with probability |$\alpha_i$|$^2$. Let $\alpha_p$ be the coefficient associated with the principal eigenvalue |$\varphi_p$>.

10

Then we have already seen that $\alpha_p$ is likely to be higher than other $\alpha_i$'s. Therefore, we should get the principal eigenvalue |$\varphi_p$> with good probability.

The modified quantum algorithm is used to manipulate the quantum states of the quantum computing device a number of times or shots, for example 10000 shots, and measurements of the first and second registers performed for each shot. At step 330, the method determines whether there are more shots to perform and if so, returns to step 320. If all shots have been performed the method moves to step 335.

At step 335, the principal eigenvalue is determined. This may be determined by finding the highest occurring value from the stored measurements of the first register 205*a*.

At step 340, the stored measurements of the second register R2 205*b* corresponding to the principal eigenvalue are retrieved, from memory 257, and the percentage of times each value occurs is determined. Each value corresponds to a node 410 and the value that occurs most often, for example with a percentage of 30% will be the node 410 with most influence in the network 400. The second most common node or second register value may have a percentage of 18% for example, and so on for all nodes or values.

At step 345, the method calculates the square roots of the respective percentages for each node to determine the eigen centrality measure for that node. In the above example, the most influential node will have an eigen centrality of 5.48 and the second most influential node will have an influence measure of 4.24.

Once the most influential nodes have been determined, the connections to these nodes may be provided with additional resources and/or resiliency. For example, in a telecommunications network, the most influential nodes may be allocated additional bandwidth and may be provided with redundant connections. In another example, the nodes may correspond to alpha users in a social network that have high influence on other users. These users may be targeted by marketing campaigns or provided with services that they may then influence others to use and in this way may maximize the spread of influence within a network.

Considering complexity, the probability of getting the principal eigenvalue scales with the sum of values of the eigenvector, and thus would, in most case, be good enough. Gates U$^{2j}$ can be prepared according to DOMINIC W. BERRY, ANDREW M. CHILDS, RICHARD CLEVE, ROBIN KOTHARI, and ROLANDO D. SOMMA. Exponential improvement in precision for simulating sparse hamiltonians. *Forum of Mathematics, Sigma*, 5:e8, 2017. Here gate $$U = e^{iHt} \text{ in } O\left(k\frac{\log(\kappa/\epsilon)}{\log\log(\kappa/\epsilon)}\right),$$

where $\kappa=d^2\|H\|_{max}t$, d is the maximum number of non-zero values in any row or column, $\|\cdot\|$ is the spectral norm of H, and $\epsilon$ is the desired accuracy.

In the above embodiment, t is the j in U$^{2j}$ and H is the adjacency matrix of an unweighted undirected graph. Assuming knowledge of the maximum degree of the nodes in the graph, the spectral norm is the largest singular value of H, which the largest eigenvalue of H*H. Since H is symmetric, H*H=H$^2$. Let $$H = \sum\nolimits_{i=1}^n \lambda_i E_i$$

be the spectral decomposition of H. Then $$H^2 = \sum_{i=1}^{n} \lambda_i^2 E_i.$$

Note that if $\kappa/\varepsilon >> 2$, then the factor $$\frac{\log(\kappa/\epsilon)}{\log\log(\kappa/\epsilon)}$$

is very much less. It explodes if $\kappa/\varepsilon \approx 2$.

According to the Greshgorin Disk Theorem, for any complex n×n matrix A, each of its eigenvalues must lie in at least one of it's Greshgorin Disks, which are defined as $D_i = B(\alpha_{ii}, \Sigma_{i \neq j} |a_{ji}|)$, where B(a,r) is a disc centered at a with radius r. The adjacency graphs of the networks will have 0's across the diagonals, and the row sums would at most be the max degree. Therefore, the largest eigenvalue would at max be the max degree. That is, the spectral norm is bounded by the max degree. For unweighted graphs, the sparsity factor d is the max degree. In that case, if m=max degree, $\kappa = d^2 \|H\|_{max} t \leq m^3 j$.

DOMINIC et al also says that we would require $$O\left(\kappa \frac{\log(\kappa/e)}{\log\log(\kappa/\epsilon)}\right) n$$

additional two qubit gates to implement the circuit, where n is the number of qubits. For us, if |V| is the number of nodes in the graph, then n=$\log_2$|V|.

To implement the other parts of the circuit, let k be the number of qubits in the first register, we need k+n Hadamard gates and $O(k^2)$ gates for the inverse QFT. We have already seen that for the $U^2j$ gates, it scales in $m^{3j}$. Therefore, one can see if m<<|V|, then this would scale much better than algorithms which scale in the number of nodes in the graph. Unweighted graphs for which influential nodes are to be detected will mostly be sparse matrices, as nodes will not normally be connected to every other node. Then the complexity after assuming that $U^{2^j}$ where $U=e^{iA}$ is easily implementable. If the first register R1 has n qubits and the second register R2 has m qubits, then we require $O(n^2)$ gates for the inverse Fourier transform, n+m Hadamard gates and the n controlled $U^{2^j}$ gates.

The quantum computing device of FIG. 2 was applied to finding the most influential members or nodes in the Zachary's karate club problem describe in Wayne W. Zachary, An Information Flow Model for Conflict and Fission in Small Groups, Journal of Anthropological Research, Vol. 33, No. 4 (Winter, 1977), pp. 452-473. Zachary's karate club is a social network of a university karate club, in which members have certain connections with each other.

The Zachary karate club dataset is represented in the graph of FIG. 4. The original data had 34 nodes however 2 nodes were removed such that the resulting graph has $2^5$=32 nodes. The main reason for doing this is that to store 34 nodes, 6 qubits are needed for the second register in R2 205b, in which case 30 of the available 34 dimensions will correspond to the same eigenvalue 0. This would affect computation as eigenvectors associated with the extra 0 eigenvalues add up and create 'noise' in the data. Reducing the number of nodes to 32 simplifies the computation for demonstration purposes, and requires only 5 qubits in the second register 205b. 5 qubits were also used in the first register, giving the dimension of the vectors of $2^{10}$=256. This dataset requires 10 Hadamard gates 210 and 5 controlled gates as well as a swap gate 215 for inverse quantum Fourier transform step. For the unitary operators a factor 24565 2-qubit gates for U, 49130 for $U^2$ and 98260 for $U^4$. Note that for U, the number of gates will depend upon the precision required for. A factor of 4913 queries is required to prepare U, 9826 queries to prepare $U^2$ and 19652 queries to prepare $U^4$. This also depends on the precision desired to approximate U. The eigen centrality was first computed classically and the top 5 ranked nodes by influence was [31, 0, 30, 2, 1].

The table below shows the top 5 influential nodes detected by the quantum algorithm. The measurement shots refer to how many times the circuit was run to get the eigenvector outputs.

| Result | Measurement Shots |
|---|---|
| 31, 0, 2, 11, 30 | 500 |
| 31, 0, 2, 30, 1 | 1000 |
| 31, 0, 30, 2, 1 | 5000 |
| 31, 0, 30, 2, 1 | 10000 |
| 31, 0, 2, 30, 1 | 15000 |

FIG. 5 illustrates a method of estimating the influence of nodes in a network according to another embodiment. The method 500 may be implemented using a quantum computer and a classical computer, or a classical computer simulating a quantum algorithm on a quantum circuit for example the system of FIG. 2.

At step 510, the method manipulates quantum states of one or more qubits in each of two registers of a quantum circuit based on a representation of nodes of the network. An example manipulation is as described with respect to 320 in FIG. 3. The nodes of the network may be represented in unitary operators or matrices applied to the second register and controlled by qubits of the second register. The qubits of the registers may be initialized to |0> and arranged into equal superposition for example using Hadamard gates. The method may also use an inverse quantum Fourier transform gate on the qubits of the first register.

At step 520, the method measures a status of the qubits of the first register. Where the first register has n qubits, together the measured value of these qubits represents one of 2n possible values and is the phase of the eigenvalue of the unitary matrix. The operations may be performed a number of times and the most common value determined as the principal eigenvalue.

At step 530, the method measures a status of the qubits of the second register, corresponding to the most common value of the first register. This corresponds to the principal eigenvector encoded in the second register. The manipulation and measuring is performed a number of times or shots.

At step 540, the method uses the measurements of the second register to estimate the influence of nodes in the network. Measurements of the second register corresponding to the principal eigenvalue determined from measurements of the first register are determined. Different values from the measurements of the second register correspond to different nodes in the network. The fraction or percentage of times respective values of the second register occur in the measurements provides an estimate of the influence of each node in the network. An eigen centrality measure of each node may be achieved by calculating the square root of the fraction or percentage of times the corresponding value occurs in the measurements of the second register.

Figure 6:
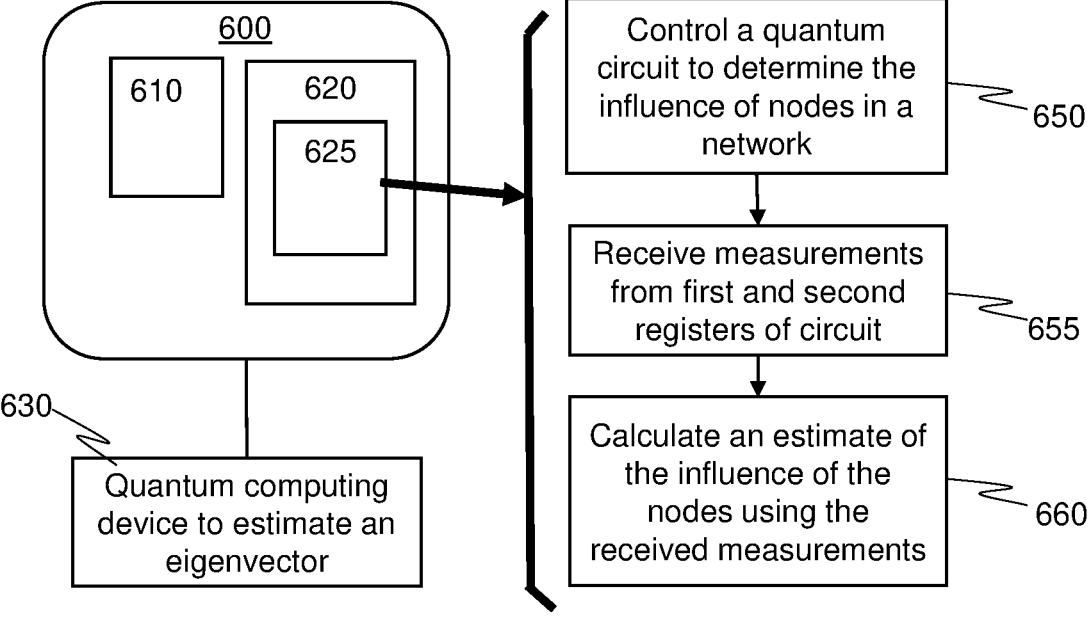
FIG. 6 shows an apparatus for estimating the influence of network nodes.

FIG. 6 illustrates an apparatus according to an embodiment, for estimating the influence of network nodes. The apparatus includes a classical computer 600 and a quantum computing device 630 such as the device of FIG. 2. The computer 600 may be arranged to control operation of the quantum computing device 630 and/or to receive and further process measurement outputs from the device 630. The computer may be configured in a cloud environment communicable with the device 630 or it may be integrated with the same in close physical proximity. In an alternative arrangement, the computer may simulate the quantum computing device using a quantum circuit for example.

The apparatus 600 comprises processing circuitry 610 (e.g. a processor) and a memory 620 in communication with the processing circuitry 610. The memory 620 contains instructions 625 which when executed by the processor 610 cause the processor to carry out methods of the embodiments. The memory 620 may also be used to store values and/or measurements. An example method is illustrated which may be performed by the apparatus 600 to determine the influence of nodes in a network.

At 650, the method controls the quantum computing device to determine the influence of nodes in a network. This may be achieved by calculating an adjacency matrix for the network and using this in a Hamiltonian simulation to derive the unitary operators or matrices of a quantum phase estimation a circuit as previously described. The computer 600 may enter the unitary matrix parameters and register initialization values, and other gate parameters as previously described, although other methods could alternatively be used.

Once the quantum circuit is configured, it is run a number of times and the first register measured. The second register is also measured after the first register is measured. At 655, the computer 600 receives these values and may store them in the memory 620.

At 660, the method calculates an estimate of the influence of the nodes using the received measurements. This may be achieved by determining the most common value occurring in the first register and analyzing corresponding measurements of the second register to find the highest occurring values. These values corresponding to nodes in the network and the more times a value or node occurs in the measurements of the second register, the more influential that node is. An eigen centrality measure of each node can be calculated by taking the square root of the value of the fraction or percentage of times the nodes value occurs in the second register—when looking at second register values corresponding to the most common first register value. The square root of the fraction or percentage of values of the second register provides an estimate of the principal eigenvector and the values of each component represent the eigen centrality of each node.

Embodiments may provide a number of advantages including faster execution of determining the influence of nodes in a network compared with classical computing approaches. The classical computing approaches also reach a practical limit as the network gets larger, whereas the quantum computing approach of the embodiments scales more slowly in terms of the gates and qubits required and is therefore able to process large heterogenous networks such as 5G telecommunications networks. The ability to process such large, complicated and heterogeneous networks allows for the more efficient and effective use and allocation of resources within the network.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim or embodiment, "a" or "an" does not exclude a plurality, and a single processor or other unit may fulfil the functions of several units recited in the statements below. Where the terms, "first", "second" etc are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method of using a quantum computing device to determine a network parameter of a network of nodes, the method comprising:

manipulating quantum states of qubits of the quantum computing device, the qubits arranged into a first and a second register each in equal superposition, the qubits of the first register conditionally influencing the qubits of the second register using operators representing the network;

performing a first measurement on the qubits of the first register to estimate a principal eigenvalue;

performing a subsequent second measurement on the qubits in the second register;

using the results of the second measurement corresponding to the principal eigenvalue to calculate the network parameter.

2. The method of claim 1, wherein manipulating quantum states of qubits of the quantum computing device comprises executing a quantum circuit having Hadamard gates coupled to each qubit of the first and second registers, the operators implemented as operator gates and having respective operator gates coupled between a said Hadamard gate of each qubit of the first register and the Hadamard gates of the qubits of the second register.

3. The method of claim 1, wherein the manipulating quantum states of qubits of the quantum computing device is performed a plurality of times and each time the first and second measurements result in respective first and second values, wherein the principal eigenvalue corresponds to the most common first value from the first measurements.

4. The method of claim 1, wherein the network is a telecommunications network and the method further comprises adjusting resources allocated to the nodes depending on the network parameter.

5. A quantum computing device comprising:

first and second registers of qubits each register arranged in an equal superposition;

a quantum circuit having a unitary operator associated with each qubit of the first register to conditionally influence the qubits of the second register;

a first measurement gate to measure a state of each qubit in the first register;

a second measurement gate to measure a state of each qubit in the second register following measurement of the first register.

6. The quantum computing device of claim 5, arranged to initialize the second register to $|+>^{\otimes m}$ before operation of the quantum circuit.

7. The quantum computing device of claim 5, wherein the quantum circuit comprises a Hadamard gate arranged to act on each qubit of the first and second registers and a Quantum Fourier Transform circuit arranged to act on the qubits of the first register before the first measurement circuit.

8. The quantum computing device of claim 7, wherein the second measurement circuit is arranged to measure the qubits of the second register directly following application of the unitary operators.

9. The quantum computing device of claim 5, further comprising a processor to estimate an eigenvector of the unitary operator using the measurements of the first and second registers.

10. Apparatus for determining a network parameter of a network of nodes, the apparatus comprising a processor and memory, the memory containing instructions executable by the processor such that the apparatus is operable to:

manipulate quantum states of qubits of a quantum computing device, the qubits arranged into a first and a second register each in equal superposition, the qubits of the first register conditionally influencing the qubits of the second register using operators representing the network;

perform a first measurement on the qubits of the first register to estimate a principal eigenvalue;

perform a subsequent second measurement on the qubits in the second register;

use the results of the second measurement corresponding to the principal eigenvalue to calculate the network parameter.

11. The apparatus of claim 10, comprising a quantum circuit to manipulate the quantum states of qubits of the quantum computing device, the quantum circuit comprising Hadamard gates coupled to each qubit of the first and second registers, the operators implemented as operator gates and having respective operator gates coupled between a said Hadamard gate of each qubit of the first register and the Hadamard gates of the qubits of the second register.

12. The apparatus of claim 10, wherein the second register is initialised to $|+>^{\otimes m}$ before manipulating the qubits.

13. The apparatus of claim 10, wherein the operators are unitary matrices each associated with a qubit of the first register and applied to the qubits of the second register depending on the state of the respective qubit of the first register, the apparatus operable to map a Hamiltonian of an unweighted undirected graph of the network to the unitary matrices.

14. The apparatus of claim 10, wherein the apparatus is operable to perform the manipulate the quantum states of the qubits a plurality of times and each time the first and second measurements result in respective first and second values, wherein the principal eigenvalue corresponds to the most common first value from the first measurements.

15. The apparatus of claim 10, wherein the network parameter is an influence measure of each node.

16. The apparatus of claim 14, wherein the apparatus is operable to determine the network parameter from the relative frequency of occurrences of corresponding second values from the second measurements.

17. The apparatus of claim 16, wherein the network parameter is an eigen centrality measure for a node and is calculated by taking a square root of the relative frequency of occurrences of the corresponding second value.

18. The apparatus of claim 10, comprising a quantum computing device that comprises:

first and second registers of qubits each register arranged in an equal superposition;

a quantum circuit having a unitary operator associated with each qubit of the first register to conditionally influence the qubits of the second register;

a first measurement gate to measure a state of each qubit in the first register; and a second measurement gate to measure a state of each qubit in the second register following measurement of the first register.

19. A non-transitory computer readable media having stored thereon a computer program comprising instructions that, when executed on at least one processor, cause the at least one processor to carry out a method of using a quantum computing device to determine a network parameter of a network of nodes, the method comprising:

manipulating quantum states of qubits of the quantum computing device, the qubits arranged into a first and a second register each in equal superposition, the qubits of the first register conditionally influencing the qubits of the second register using operators representing the network;

performing a first measurement on the qubits of the first register to estimate a principal eigenvalue;

performing a subsequent second measurement on the qubits in the second register;

using the results of the second measurement corresponding to the principal eigenvalue to calculate the network parameter.

* * * * *